Figure 1:
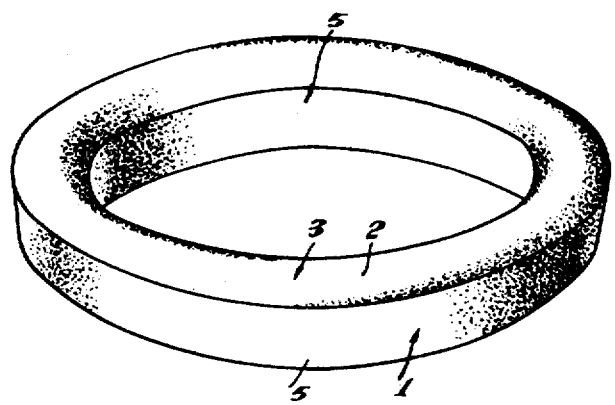

July 17, 1956  J. S. JARVIS  2,755,118
PACKING RING
Filed Sept. 4, 1953

INVENTOR
Jack Stanley Jarvis
Albert Jacobs
Attorney

United States Patent Office 2,755,118
Patented July 17, 1956

2,755,118

PACKING RING

Jack Stanley Jarvis, Chessington, England, assignor to Hall & Hall Limited, Hampton, England, a company of Great Britain and Northern Ireland Application September 4, 1953, Serial No. 378,658

3 Claims. (Cl. 288—7)

This invention relates to packing rings and in particular to packing rings of the kind (hereinafter referred to as "an automatic packing") having side walls adapted to be expanded against sealing surfaces to provide a seal and suitable for use with rotating or reciprocating shafts.

Channel packing rings are known in which the side walls or wings are adapted to be expanded by fluid pressure in the channel. It is known to use spring actuated expanding means with channel packing rings so as to hold the wings of the U expanded when there is no fluid pressure or when the fluid pressure is insufficient to maintain the seal. Furthermore it is known to use with channel packing rings a filling ring of semicircular cross section disposed in the same stuffing box so that when the parts are assembled the two rings are pressed together with the semi-circular periphery entering between and expanding the wings.

In the case of channel packing rings there is a tendency for wear to take place particularly at the heel due to fluid pressure distorting the ring. There is also a tendency for the wings to collapse inwardly after being used for a while and this is not entirely cured by the fitting of a ring into the channel; neither does such a ring provide any substantial assistance in preventing excess wear at the heel as fluid can enter between the two members and holes are frequently provided in the ring of semi-circular cross section to facilitate such entry and permit the fluid pressure to expand the channel.

One of the objects of the present invention is to provide an improved packing ring in which the fluid to be retained does not gain access to the channel.

Another object of the invention is to provide means for expanding the walls when subjected to fluid pressure, said means sealing said channel against the entry of the fluid to be retained.

A further object of the invention is to provide a packing in which the expanding means are sealed into and merge with the walls of the packing.

Other objects of the invention will appear from the following description.

According to the present invention a packing ring of the kind described is characterised by the provision of a resilient filling member between said side walls formed integrally with or fitted in and sealed thereinto and adapted to be deformed by fluid pressure on the surface between said side walls to cause expansion of the said walls. The filling member may be made of a more easily deformable material than the said side walls. The side walls may be reinforced for example with fabric to provide increased stiffness and give greater wearing properties. The filling member may be made to occupy the whole of the space enclosed between the side walls or only part thereof leaving a space which may be left as an air filled space or filled with any other resilient substance.

Referring to the drawings filed herewith:

Fig. 1 shows a perspective view and

Figure 2:
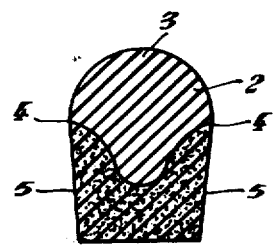

Fig. 2, a cross section to an enlarged scale of one form of packing ring made according to the present invention.

In the form shown in the drawings a channel shaped ring 1 formed of a plurality of layers of fabric impregnated with artificial rubber known under the British registered trademark "Hallprene" is filled at 2 with a ring also of "Hallprene" and the whole cured in a mould the filling 2 having an exposed surface 3 of convex semi-circular cross section the edges of which merge with the outer edges 4 of the straight and slightly diverging walls 5 of the fabric channel 1.

In use the curved surface 3 is exposed to fluid pressure whilst the edges 4 and walls 5 are in contact on the one side with the stuffing box and on the other side with the shaft or in the case of a piston with the piston groove and cylinder respectively. The fluid pressure tends to flatten the rounded surface 3 and the filling 2 being resilient is subject to cold flow which increases the pressure of the walls 5 in direct relation to the fluid pressure. Being moulded with slightly divergent walls and because the filling 2 is resilient the walls of the packing ring will not tend to collapse and once put under pressure will maintain a pressure and retain a seal even though the fluid pressure falls to zero.

With a packing ring constructed as above described the edges of the channel are protected against damage by being merged with the filling member, the rounded exposed surface helps to ensure that when in a stuffing box the fluid pressure can readily reach all parts of the exposed surface. Such a ring has been found to be particularly suitable for use with shafts which are slightly out of alignment or in cylinders of hydraulic apparatus which have become oval with wear.

What I claim and desire to secure by Letters Patent is:

1. An automatic unitary packing capable of being expanded by fluid pressure comprising, a continuous channel-shaped ring member of fabric impregnated with rubber, the central portion of the surface defining the channel being concave while the outer wing portions are convex, thereby forming inner and outer sealing walls, and a filling ring member of greater resiliency than the channel member having a shank portion filling the channel and a convex head portion merging with the exterior surfaces of the sealing walls of the channel-shaped ring member, said shank portion having a surface substantially conforming to the surface defining the channel, the entire surface of the shank portion of the filling ring member and the entire surface defining the channel being molded together to form said ring members into a unitary packing body.

2. An automatic unitary packing as set forth in claim 1, wherein the sealing walls of the channel-shaped ring member diverge toward the filling ring member, said filling ring member, when under compression, being adapted to exert a spreading action against the sealing walls of the channel-shaped ring member.

3. A packing as set forth in claim 1, wherein the concave portion and convex portions of the surface defining the channel form a continuous smooth curve, and wherein the outer surface of the head portion of the filling ring member is semi-circular.

References Cited in the file of this patent

UNITED STATES PATENTS

| | | |
|---|---|---|
| 1,280,514 | Mann | Oct. 1, 1918 |
| 1,381,942 | Stewart | June 21, 1921 |
| 1,466,641 | Crane | Aug. 28, 1923 |
| 1,955,157 | Wayne | Apr. 17, 1934 |
| 2,509,436 | Isenbarger | May 30, 1950 |
| 2,639,198 | Kirkham | May 19, 1953 |

UNITED STATES PATENT OFFICE
CERTIFICATE OF CORRECTION

Patent No. 2,755,118  July 17, 1956

Jack Stanley Jarvis

It is hereby certified that error appears in the above numbered patent requiring correction and that the said Letters Patent should read as corrected below.

In the heading to the printed specification, between lines 6 and 7, insert -- Claims priority, application Great Britain September 9, 1952 --.

Signed and sealed this 11th day of September 1956.

(SEAL)
Attest:
KARL H. AXLINE
Attesting Officer

ROBERT C. WATSON
Commissioner of Patents

UNITED STATES PATENT OFFICE

CERTIFICATE OF CORRECTION

Patent No. 2,755,118                                                   July 17, 1956

Jack Stanley Jarvis

It is hereby certified that error appears in the above numbered patent requiring correction and that the said Letters Patent should read as corrected below.

In the heading to the printed specification, between lines 6 and 7, insert -- Claims priority, application Great Britain September 9, 1952 --.

Signed and sealed this 11th day of September 1956.

(SEAL)
Attest:

KARL H. AXLINE
Attesting Officer

ROBERT C. WATSON
Commissioner of Patents